United States Patent [19]

Kotter et al.

[11] Patent Number: 4,994,430

[45] Date of Patent: Feb. 19, 1991

[54] METHOD OF PREPARING A PLATE-LIKE SUPPORT BEARING CATALYTICALLY ACTIVE COMPOUNDS

[75] Inventors: Michael Kotter, Bruchsal; Friedrich Weyland, Leimen-St. Ilgen, both of Fed. Rep. of Germany

[73] Assignee: Kraftanlagen Aktiengesellschaft, Fed. Rep. of Germany

[21] Appl. No.: 457,816

[22] PCT Filed: May 26, 1989

[86] PCT No.: PCT/EP89/00586

§ 371 Date: Jan. 18, 1990

§ 102(e) Date: Jan. 18, 1990

[87] PCT Pub. No.: WO90/00089

PCT Pub. Date: Jan. 11, 1990

[30] Foreign Application Priority Data

Jun. 29, 1988 [DE] Fed. Rep. of Germany ....... 3821920

[51] Int. Cl.$^5$ .......................... B01J 32/00; B01J 35/02
[52] U.S. Cl. ................................... 502/439; 502/527
[58] Field of Search ............................... 502/439, 527

[56] References Cited

U.S. PATENT DOCUMENTS 4,771,026  9/1988  Kainer et al. ................... 502/527 X
4,847,234  7/1989  Hums ............................. 502/439 X

FOREIGN PATENT DOCUMENTS 3501330  1/1986  Fed. Rep. of Germany .
54-28289  3/1979  Japan ................................... 502/527

*Primary Examiner*—W. J. Shine

[57] ABSTRACT

An embossed, solid-surface or grid-like metal base structure is degreased and etched and then provided with a vitreous enamel coating, using an enamel which forms a low-porosity bottom layer and a rough top layer of high resistance to acid. The base structure coated with this ground coat of enamel is immersed in a catalyst slip liquefying under the action of shear forces, which is prepared essentially from a powder of the catalytically active compounds, a binding agent, water, and, in some cases, one or more wetting agents. The wetted base structure is removed from the bath while movement of the slip bath is sustained by a stirrer or a vibrator, and then delivered to a drying process. The dried coating of slip can, if necessary, also be calcined and/or impregnated with an alkyl silicate or a solution thereof.

12 Claims, No Drawings

METHOD OF PREPARING A PLATE-LIKE SUPPORT BEARING CATALYTICALLY ACTIVE COMPOUNDS

The invention relates to a method of preparing a plate-like support bearing catalytically active compounds, including the degreasing or etching of an embossed, solid-surfaced or grid-like metal base structure followed by the application of a vitreous enamel coating thereto.

Many different methods are known for producing plate-like supports bearing catalytically active compounds. With the aim of achieving a continuous, low-cost production it has already been proposed to feed sheet metal for the metal base structure continuously from a coil, to provide it with spaced cuts in a certain pattern running the width of the band, i.e., transversely of the direction of transport, to make the band an expanded metal plate material by stretching it in the feed direction, i.e., the direction of transport of the band, and to degrease it. Then a molten metal is sprayed onto the surface of the degreased expanded-metal band for the purpose of applying a catalytically active substance onto the rough surface thus formed. Between leaf-like protective layers, an embossing was then performed step by step to form ribs in the direction of feed or movement of the expanded metal band, and finally the expanded metal plate provided with the catalytically active compounds was trimmed to size after removal of the protective layers (DE-PS 32 08 634). Catalyst plates of this kind offer the advantage of low-cost coating independently of any special shaping of the catalyst support. These plate-like supports bearing catalytically active compounds have been proposed for use as catalyst plates for the removal of nitrogen from exhaust gases.

In the removal of nitrogen from exhausts from boilers, special attention must be paid to the danger of poisoning the catalytically active surfaces of the metal support by impurities contained in the exhaust gases. Knowledge gained in this regard indicates that the danger of poisoning increases with the duration of the contact between the catalyst poisons and the catalytically active surfaces. One possibility is to dispose the supports of catalytically active surfaces in rotating regenerative heat exchangers in place of the heat-exchanging storage masses in order to expose the supports of the catalytically active compounds alternately to the stream of a pure gas, e.g., the purified gas, and to that of the gas that is to be cleaned. The purifying apparatus that have been developed and proven for these rotating regenerative heat exchangers can then continuously remove catalyst poisons deposited onto the catalytically active surfaces. Purification systems of this kind, however, place considerable stress on the catalytically active surfaces and threaten them with destruction by blasting them with the jets of the cleaning medium, especially air or superheated steam.

The invention is addressed to the problem of providing plate-like supports, regardless of their particular shape, with a firmly adherent coating of catalytically active compounds, and especially of achieving at the same time a coating that is uniform over the entire surface.

Setting out from a method of the kind described above, the method of the invention is characterized by the fact that a vitreous enamel forming a low-porosity bottom layer and a rough top layer of high resistance to acid is applied to the metal base structure, and is fired on this surface as a ground coat, and furthermore that the base structure covered with the ground coat after firing is first wetted with a catalyst slip liquefying under the influence of shear forces and formed of a powder of catalytically active compounds, a binding agent and water as well as wetting agents in some cases, by immersing it into a stirred bath of catalyst slip, and the wetted base structure is removed again from the bath while the stirring of the slip is sustained, and it is then delivered to a drying operation. During their immersion in the stirred slip, which is rendered fluid by the action of shear forces, the plates or grids, regardless of their particular configuration, such as multiple texturing, are uniformly wetted by this method with the desired coating thickness based on the chosen consistency of the slip.

While the plates or grids are immersed in the slip, a penetration of the catalyst slip rendered fluid by the action of shear forces into the recesses of the rough enamel overcoat is achieved, and thereby a mechanically stable "tooth" between the enamel and catalyst coatings. When the plates or grids are removed from the bath the slip has already solidified on the surfaces of the enameled metal support to such an extent that, within the desired coating thickness of preferably 0.5 to 2 mm, it no longer drains off from the surface of the plate-like support.

The catalyst slip wets the contours of a support plate such that the increase in the thickness of the support plate by the coating remains constant over the entire surface area, i.e., recesses are not filled up with the catalyst slip, for example. Thus a support plate can be provided with a coating up to 1 mm thick.

The continuous wetting of the base structure provided with the enamel by immersion in a downward guiding means into a slip bath and removal therefrom in an upward guiding means, or the discontinuous wetting of the base structure provided with the vitreous enamel while at the same time carried substantially horizontally with periodical raising of a slip bath followed by lowering with the further transport of the wetted support is to be applied equally to individual supports each by itself or to several supports at the same time, and includes also the combining of several supports in basket-like cages for wetting. With this kind of wetting with a catalyst slip rendered fluid by the action of shearing forces, clogging of the gas passages during the wetting process is excluded, even when a plurality of enameled base structures are combined within basket-like cages. Wetting in basket-like cages is thus to be applied also to the task of the restoration of coatings.

The stirring of the slip bath can be achieved to special advantage by the immersion of a vibrator or by the use of a stirrer. In a different embodiment the slip bath is indirectly stirred from one or more walls of the vessel. For example, the bottom of the vessel containing the slip bath can for this purpose be supported on a vibrator, or vibrators can be disposed on the periphery of same. The vibrations can be excited electromechanically, pneumatically or by ultrasound, irregular vibrations being generated to prevent standing waves in the slip bath for the wetting of the base structure coated with the ground enamel.

The addition of blowing agents, such as silicon carbide, to the enamel in powder form promotes the forming of a low-porosity bottom layer and a rough top layer. While the low-porosity bottom layer seals off the metallic base structure, the gas bubbles rising up when the enamel is fired, on account of the blowing agent it contains, causes the formation of a rough top layer which is thus capable of holding the catalyst slip. The enamel coating combines the functions of a thermal equalization layer between the metal support and the coating of catalytically active compounds with those of a coating for the protection of the metal base structure and a coating to which the slip can adhere.

The fluidization of the slip by the action of shear forces can be assisted by additives having a thixotropic effect, such as xanthan and carboxypolymethylene. Another possibility for fluidizing the catalyst slip by the action of shear forces consists in selecting the grain size spectrum on the basis of the production of the powder of the catalytically active compounds. For this purpose the powder is used in such a grain size spectrum that less than 1 wt % of the powder has a grain diameter smaller than 10 $\mu$m and less than 5 wt % has a grain diameter greater than 200 $\mu$m. If the grain diameter in the powder mixture of catalytically active compounds is greater than that, the above-specified grain size spectrum is to be established by grinding, with the addition in some cases of the liquid used in preparing the slip. Especially advantageous for the application of a tightly adherent coating is the addition of up to 2% wetting agents and up to 5% of agents producing a fluidization of the slip plus water and/or a binding agent to achieve the slip consistency that corresponds to the desired thickness of the coating. For example, organic esters are suitable as wetting agents, and colloidal silicon dioxide as binding agent.

Wetting with the catalytically active compound and drying it on the enameled metal base structure, followed by calcination, contributes to the strength of the coating.

It is also desirable to impregnate the coated support with an alkyl silicate or a solution thereof to improve the strength of the coating through the building up of bridges of solid matter. Agents for this purpose are particularly tetramethylorthosilicate or ethyl or methyl polysilicate, mixed if desired with industrial alcohols, especially methanol.

For the continuous production of plate-like supports coated with catalytically active compounds it has been found to be especially advantageous first to take enameling steel from a coil and emboss it serially and trim it to dimensions, and also then to degrease or etch the cut pieces serially, apply an enamel to them and fire it on, then wet the pieces in an agitated bath of a catalyst slip, and lastly fire them and, if desired, calcine them. This kind of coating procedure is technically easy to perform. Since the plate-like support is shaped before it is coated with the catalytically active compounds, all that is necessary is to dry and, if desired, calcine the coating. The heat treatment of calcination is to follow the drying of the catalytically active compounds on the metal support only in cases where extreme exposure to erosion is involved.

By the proposed method of preparing a plate-like support bearing catalytically active compounds, revolving regenerative heat exchangers can be provided with supports bearing catalytically active compounds either for the oxidation of carbon monoxide or for the reduction of the nitrogen oxides. For this purpose, compounds can be included in the mixtures of catalytically active compounds for the reduction of nitrogen oxides, or compounds for the oxidation of carbon monoxide can be included in the corresponding slip. In accordance with the varying level of optimum reaction temperatures for the reduction of the nitrogen oxides on the one hand, and those for the oxidation of the carbon monoxide on the other hand, catalytically active coatings are advantageously provided on the hot gas side and, through heat exchanging surfaces separate therefrom if desired, coatings for the oxidation of carbon monoxide on the cold gas side. What is to be understood by "hot gas side" and "cold gas side" is not only a combination within a single catalyst, but also division into catalysts disposed separately from one another, for example into those at the so-called hot end of a boiler system, directly connected to the boiler, for the reduction of nitrogen oxides, and into those on the so-called cold end, i.e., for example in direct association with a wet desulfuration, within the exhaust stream of a boiler system. With this kind of system it is possible to counteract the danger that primary measures for the reduction of nitrogen oxides on the firing side may be achieved at the cost of an increased discharge of carbon monoxide in the exhausts to the atmosphere, thus equally burdening the environment.

The preparation of plate-like supports bearing catalytically active compounds for the construction of catalysts for the reduction of the nitrogen oxides in the exhausts of combustion apparatus will be further described in the example that follows.

EXAMPLE

The metal base structure in the form of support plates suspended on an endless conveyor belt was coated, as it passed through a spray booth, with a vitreous enamel suspension. The plates were then given a preliminary drying at a temperature of 200° C. and then carried through a firing oven at a temperature of 820° C. for a period between 6 and 10 minutes. The support plates were then cooled for a period of 30 minutes in the ambient air, and then immersed for one minute into a bath of catalyst slip and removed again from the bath. Then the support plates, coated with the slip, are dried in quiet ambient air for a period of 10 hours. The elongated container of the slip had a rectangular bottom surface, and vibrators fastened to the lateral walls produced unregulated vibrations in the container while the support plates were being immersed.

The catalyst slip consisted of a mixture of titanium oxide powder doped with transitional metal oxides, especially vanadium and tungsten oxides, as catalytically active compounds, and containing a water glass of colloidal silicon oxide as binding agent.

To improve resistance to rub-off, the slip contained mineral fibers. Also, a mixture of carboxypolymethylene and water was added as a thixotropic agent Lastly the slip contained also an organic ester ("Glydol" of Zschimmer & Schwarz) as wetting agent.

Support plates coated by the above-described method were installed in a stationary experimental set-up. The sweeping length was 0.9 m. Through this experimental line, a part of the exhaust gas from a boiler fired with brown coal was carried at a temperature of 340° C. and an empty tube velocity of 12 m/sec. The feed of the reducing agent (ammonia) to this gas stream was performed in equal molar amounts, i.e., the ratio of the nitrogen oxides contained in the boiler's exhaust to the ammonia added amounted to 1. Under these conditions a nitrogen oxide reduction of 82% was achieved.

We claim:

1. Method of preparing a plate-like support bearing catalytically active compounds, with degreasing or etching of an embossed, solid-surfaced or grid-like metal base structure, followed by application of a vitreous enamel coating, characterized in that a vitreous enamel which forms a low-porosity bottom layer and a rough top layer of high resistance to acid is applied to the metal base structure and is fired onto its surface as the vitreous enamel ground, and furthermore that the base structure coated with the vitreous enamel ground is wetted after the firing with a catalyst slip liquefying under the influence of shear forces and composed of a powder of catalytically acting compounds, a binding agent and water, by immersion into an agitated catalyst slip bath, and the wetted base structure is removed from the bath again while maintaining the movement of the slip bath, and then delivered to a drying process.

2. Method according to claim 1, characterized in that the base structure provided with the vitreous enamel is continuously wetted through a conveyor with the catalyst slip by immersion into the slip bath in a downward guiding means and removal from same in an upward guiding means.

3. Method according to claim 1, characterized in that the base structure provided with the vitreous enamel is carried substantially horizontally and at the same time is wetted discontinuously with the catalyst slip with periodic raising and lowering of the slip bath, and is then further advanced.

4. Method according to claim 1, characterized in that the slip bath is directly agitated by immersing a vibrator or stirrer into the bath of the catalyst slip.

5. Method according to claim 1, characterized in that the bath liquid is agitated indirectly from one or more walls of the slip bath vessel.

6. Method according to claim 1, characterized in that blowing agents are added to the enamel mixture.

7. Method according to claim 1, characterized in that agents are added to the catalyst slip which aid the fluidization of the slip by the action of shear forces.

8. Method according to any one of the preceding claims, characterized in that the powder of catalytically acting compounds is used in such a grain size spectrum that less than 1 wt % of the powder has a grain diameter $<10$ $\mu$m and less than 5 wt % has a grain size diameter $>200$ $\mu$m.

9. Method according to any one of claims 1 to 7, characterized in that up to 2% of wetting agent, up to 5% of agents producing a fluidization of the slip, and water and/or binding agent are added to the slip bath until a slip consistency is reached corresponding to the desired thickness of the coating.

10. Method according to any one of claims 1 to 7, characterized in that the wetting and subsequent drying of the catalyst slip on the enameled, metal base structure is followed by a calcination.

11. Method according to any one of claims 1 to 7, characterized in that the drying of the wetted support or the calcination of the coated support is followed by an impregnation with an alkyl silicate or with a solution of same.

12. Method for the continuous production of plate-like supports bearing catalytically acting compounds according to claim 1, characterized in that first an enameling steel is pulled from a coil and embossed serially, and cut in sections of the desired dimensions, and afterward the sections are degreased or etched serially, a vitreous enamel is applied to them and fired on, then the sections are wetted in a stirred bath of a catalyst slip, and they are finally dried.

* * * * *